(12) United States Patent
Giardino et al.

(10) Patent No.: US 6,353,062 B1
(45) Date of Patent: *Mar. 5, 2002

(54) CONTINUOUS PROCESS FOR PRODUCING POLY(TRIMETHYLENE TEREPHTHALATE)

(75) Inventors: Carl J. Giardino, Hixson, TN (US); David B. Griffith, Houston, TX (US); Chungfah Howard Ho, Kinston; James M. Howell, Greenville, both of NC (US); Michelle Hoyt Watkins, Waynesboro, VA (US); Joseph James Duffy, Newark, DE (US)

(73) Assignee: E. I. du pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/501,700

(22) Filed: Feb. 11, 2000

(51) Int. Cl.[7] .............................. C08F 2/00; C08G 63/08
(52) U.S. Cl. ..................... 526/65; 528/272; 528/308.6; 526/67; 526/68; 526/71
(58) Field of Search .................. 528/272, 308.6; 526/65, 67, 68, 71

(56) References Cited

U.S. PATENT DOCUMENTS

| | | | |
|---|---|---|---|
| 2,727,882 A | 12/1955 | Vodonik | |
| 2,829,153 A | 4/1958 | Vodonik | 260/470 |
| 2,932,625 A | 4/1960 | Burton et al. | 260/75 |
| 2,933,476 A | 4/1960 | Fisher | 260/75 |
| 2,973,341 A | 2/1961 | Hippe et al. | 260/75 |
| 3,054,776 A | 9/1962 | Higgins | 260/75 |
| 3,167,531 A | 1/1965 | Parker et al. | 260/75 |
| 3,192,184 A | 6/1965 | Brill | 260/75 |
| 3,534,082 A | 12/1965 | Armstron et al. | 260/475 |
| 3,438,942 A | 4/1969 | Scheller et al. | 260/75 |
| 3,441,540 A | 4/1969 | Muller et al. | 260/75 |
| 3,506,622 A | 4/1970 | Higgins | 260/75 |
| 3,609,125 A | 9/1971 | Fujimoto et al. | 260/75 |
| 3,676,485 A | 7/1972 | Lewis et al. | 260/475 P |
| 3,936,421 A | 2/1976 | Hayashi et al. | 260/45.75 K |
| 4,049,635 A | 9/1977 | Cleary | 260/75 R |

(List continued on next page.)

FOREIGN PATENT DOCUMENTS

WO 97/21754 6/1997

OTHER PUBLICATIONS

Traub et al., Mechanical Properties of Fibers Made of Polytrimethylene Terephthalate, *Chemical Fibers International*, 45, 110–111, Apr. 1995.

Schauhoff et al.,, New Developments in the Production of Polytrimethylene Terephthalate (PTT), *Man–Made Fiber Year Book*, Sep. 1996.

*Primary Examiner*—Samuel A. Acquah
(74) *Attorney, Agent, or Firm*—Nancy S. Mayer; Mark D. Kuller

(57) ABSTRACT

A continuous process for the production of poly(trimethylene terephthalate) is disclosed. According to the process, a liquid feed mixture comprising bis-3-hydroxypropyl terephthalate and/or low molecular weight polyesters of 1,3-propanediol and terephthalic acid, the liquid feed mixture having a mole ratio of propylene groups to terephthalate groups of 1.1 to 2.2 is fed to a prepolymerizer. Bis-3-hydroxypropyl terephthalate and the low molecular weight polyesters are continuously polymerized to form a poly(trimethylene terephthalate) prepolymer and a first stream of gaseous by-products. Poly(trimethylene terephthalate) prepolymer having a relative viscosity of at least about 5 is continuously withdrawn from the prepolymerizer and continuously fed to a final polymerizer, where it is continuously polymerized to form a higher molecular weight poly(trimethylene terephthalate) and a second stream of gaseous by-products. Higher molecular weight poly(trimethylene terephthalate) having a relative viscosity of at least about 17 is continuously withdrawn from the final polymerizer.

29 Claims, 2 Drawing Sheets

U.S. PATENT DOCUMENTS

| | | | |
|---|---|---|---|
| 4,056,514 A | 11/1977 | Strehler et al. | 260/75 R |
| 4,096,122 A | 6/1978 | Schade et al. | 260/75 M |
| 4,110,316 A | 8/1978 | Edging et al. | 526/68 |
| 4,289,895 A | 9/1981 | Burkhardt et al. | 560/92 |
| 5,340,909 A | 8/1994 | Doerr et al. | 528/276 |
| 5,434,239 A | 7/1995 | Bhatia | 528/274 |
| 5,459,229 A | 10/1995 | Kelsey et al. | 528/275 |
| 5,466,776 A | 11/1995 | Krautstrunk et al. | 526/68 |
| 5,510,454 A | 4/1996 | Stouffer et al. | 528/308.1 |
| 5,540,868 A | 7/1996 | Stouffer et al. | 264/13 |
| 5,552,513 A | 9/1996 | Bhatia | 528/308.3 |
| 5,559,205 A | 9/1996 | Hansen et al. | 528/279 |
| 5,599,900 A | 2/1997 | Bhatia | 528/491 |
| 5,633,018 A | 5/1997 | Stouffer et al. | 425/8 |
| 5,663,281 A | 9/1997 | Brugel | 528/272 |
| 5,670,606 A | 9/1997 | Stouffer et al. | 528/272 |
| 5,677,415 A | 10/1997 | Bhatia | 528/176 |
| 5,688,898 A | 11/1997 | Bhatia | 528/272 |
| 5,703,179 A | 12/1997 | Asakura et al. | 526/59 |
| 5,763,104 A | 6/1998 | Stouffer et al. | 528/503 |
| 5,786,443 A | 7/1998 | Lowe | 528/272 |
| 5,798,433 A | 8/1998 | Schmidt et al. | 528/279 |
| 5,811,496 A | 9/1998 | Iwasyk et al. | 525/444 |
| 5,840,957 A | 11/1998 | Kurian et al. | 560/92 |
| 5,849,849 A | 12/1998 | Bhatia | 525/444 |
| 5,891,985 A | 4/1999 | Brugel | 528/283 |
| 5,990,265 A | 11/1999 | Blanchard et al. | 528/272 |
| 6,277,947 B1 | 6/2001 | Kelsey et al. | |

CONTINUOUS PROCESS FOR PRODUCING POLY(TRIMETHYLENE TEREPHTHALATE)

FIELD OF THE INVENTION

The present invention relates to a continuous process for the production of poly(trimethylene terephthalate), which is also commonly referred to as poly(1,3-propylene terephthalate). The process of the invention can be used as part of a three-vessel process, the first vessel being either an ester exchanger for producing a mixture of bis-3-hydroxypropyl terephthalate and low molecular weight polymers of 1,3-propanediol and terephthalic acid having an average degree of polymerization of 15 or less from dimethylterephthalate and 1,3-propanediol or a reactor for producing the starting material from terephthalic acid and 1,3-propanediol. The second vessel is a prepolymerizer, and the third vessel is a final polymerizer or finisher.

BACKGROUND OF THE INVENTION

Continuous, three-vessel processes are known for the production of poly(ethylene terephthalate). For example, Vodonik, U.S. Pat. No. 2,727,882 discloses a process for the continuous polymerization of bis-2-hydroxyethyl terephthalate using a prepolymerizer.

Also known are batch processes for the production of poly(trimethylene terephthalate). For example, Doerr et al., U.S. Pat. No. 5,340,909 discloses the production of poly(trimethylene terephthalate) using either an ester exchange reaction starting with lower dialkyl terephthalate ester or direct esterification of terephthalic acid followed by a polycondensation reaction, both of which are carried out in batches using an autoclave.

It would be highly desirable to provide a continuous, three-vessel process for the production of poly(trimethylene terephthalate). It would also be desirable to provide a continuous process for the production of poly(trimethylene terephthalate) in which the production of by-products, such as acrolein and allyl alcohol, is minimized and in which the molecular weight of the final poly(trimethylene terephthalate) polymer is maximized. The present invention provides such a process.

SUMMARY OF THE INVENTION

The invention comprises a continuous process for the production of poly(trimethylene terephthalate) comprising the steps of:

(a) continuously feeding a liquid feed mixture to a prepolymerizer, the liquid feed mixture comprising at least one of bis-3-hydroxypropyl terephthalate and low molecular weight polyesters of 1,3-propanediol and terephthalic acid, and the liquid feed mixture having a mole ratio of propylene groups to terephthalate groups of 1.1 to 2.2;

(b) continuously polymerizing bis-3-hydroxypropyl terephthalate and said low molecular weight polyesters to form a poly(trimethylene terephthalate) prepolymer and a first stream of gaseous by-products;

(c) continuously withdrawing the poly(trimethylene terephthalate) prepolymer from the prepolymerizer, the prepolymer having a relative viscosity of at least about 5;

(d) continuously feeding the poly(trimethylene terephthalate) prepolymer to a final polymerizer and continuously polymerizing the poly(trimethylene terephthalate) prepolymer to form a higher molecular weight poly(trimethylene terephthalate) and a second stream of gaseous by-products; and (e) continuously withdrawing the higher molecular weight poly(trimethylene terephthalate) from the final polymerizer, the higher molecular weight poly(trimethylene terephthalate) having a relative viscosity of at least about 17.

DETAILED DESCRIPTION OF THE INVENTION

The process of the invention is part of a continuous, three-vessel, three-stage process for the production of poly(trimethylene terephthalate). The first stage in the process is either an ester exchange or direct esterification reaction, depending upon whether the starting material for the process is dimethylterephthalate or terephthalic acid. The second stage is a prepolymerization, and the third stage is a final polymerization. The present invention is useful to provide a continous process for the production of poly(trimethylene terphthalate) in which the production of byproducts is minimized and the molecular weight of the polymer produced is maximized.

The term "ppm" is used herein to mean parts per million which is equal to micrograms per gram 1. Production of Prepolymerizer Feed Materials The feed material for the prepolymerizer may be produced either by ester exchange from dimethylterephthalate and 1,3-propanediol or by direct esterification from terephthalic acid and 1,3-propanediol. Both processes yield bis-3-hydroxypropyl terephthalate (referred to as "monomer") and low molecular weight polyesters of 1,3-propanediol and terephthalic acid having an average degree of polymerization of 15 or less (referred to as "oligomers").

Figure 1:
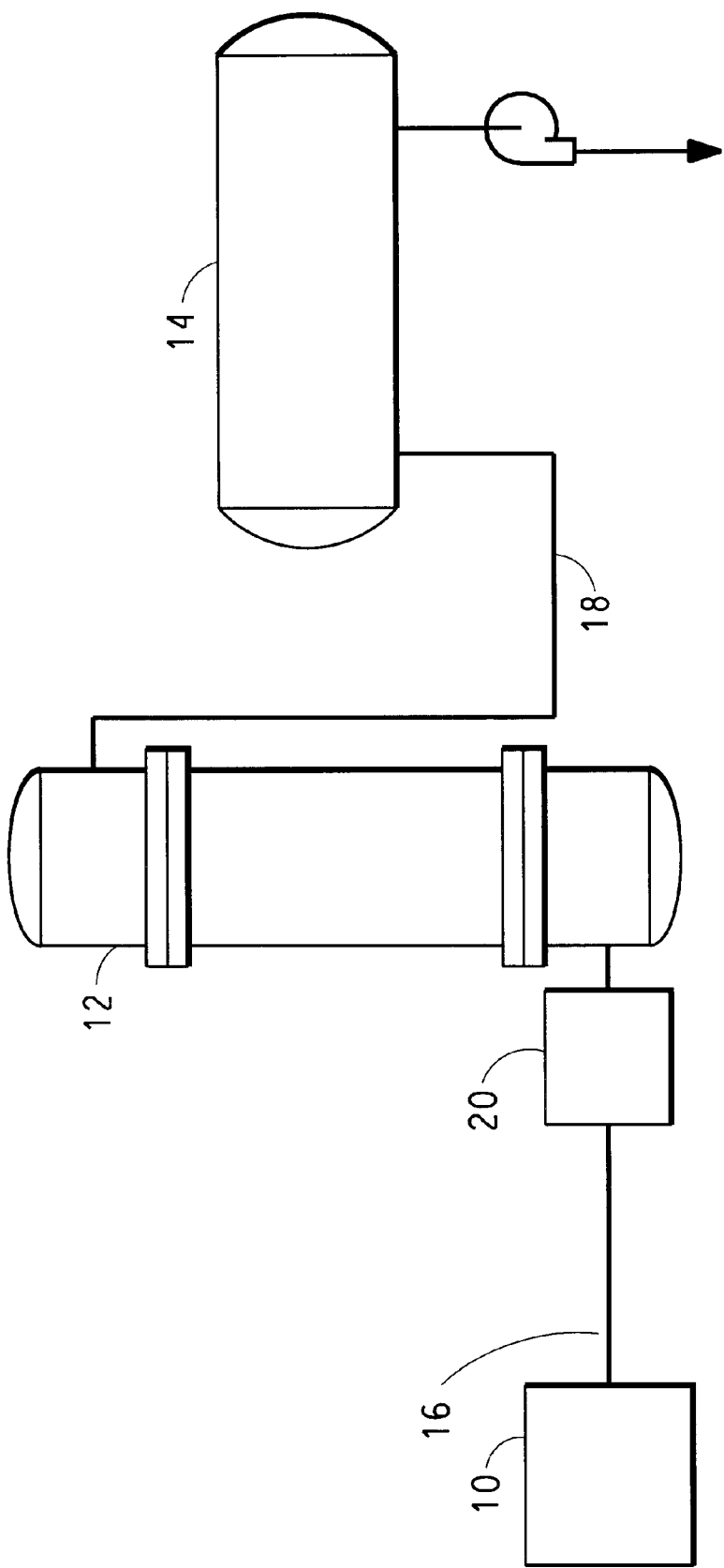
FIG. 1 is a schematic representation of an apparatus useful in carrying out the process of the invention.

As shown in FIG. 1, reaction vessel 10 is a source of monomer and/or oligomers, which are fed to prepolymerizer 12. Reaction vessel 10 can be either an ester exchange reactor or a direct esterification reactor.

Whether the monomer/oligomer feed mixture is produced by direct esterification from terephthalic acid or ester exchange from dimethylterephthalate, a catalyst is added prior to the esterification or transesterification reaction. Catalysts useful in the ester exchange process include organic and inorganic compounds of titanium, lanthanum, and zinc. Titanium catalysts, such as tetraisopropyl titanate and tetraisobutyl titanate are preferred and are added to the 1,3-propanediol in an amount sufficient to yield 20 to 90 ppm of titanium by weight based on the finished polymer. These levels produce relatively low unreacted dimethylterephthalate in the ester exchange reaction (less than 5% by weight based on the total weight of the exit stream from the ester exchanger), give reasonable reaction rates in the prepolymerization and final polymerization steps, and produce polymer with CIELAB b* color of less than 8 measured by the CIE 1976 CIELAB color scale as standardized by CIE, the Commission International de L'Eclairage. The b-value shows the degree of yellowness, with a higher numerical Value showing a higher (undesirable) degree of yellowness. Another useful ester exchange catalyst is lanthanum acetate, which may be added in an amount sufficient to yield 125 to 250 ppm of lanthanum by weight based on the finished polymer. Following the ester exchange reaction, the lanthanum is deactivated by the addition of phosphoric acid in an amount sufficient to yield 10 to 50 ppm of phosphorus by weight based on the finished polymer. Tetraisopropyl titanate or tetraisobutyl titanate is then added as a polycondensation catalyst in an amount sufficient to yield 10 to 50 ppm of titanium by weight based on the finished polymer. Amounts of other ester exchange catalysts are adjusted to give the same effect as the 20 to 90 ppm of titanium.

Catalysts useful in the direct esterification process include organo-titanium and organo-tin compounds, which are added to the 1,3-propanediol in an amount sufficient to yield at least 20 ppm of titanium, or at least 50 ppm of tin, respectively, by weight based on the finished polymer.

Additional catalyst may be added to the monomer/oligomer mixture after the ester exchange or direct esterification reaction and prior to prepolymerization.

Whether the monomer/oligomer feed mixture is produced by direct esterification from terephthalic acid or ester exchange from dimethylterephthalate, the mole ratio of propylene groups to terephthalate groups is maintained at about 1.1 to 2.2, preferably about 1.4 to 1.8, and most preferably about 1.5 entering the prepolymerizer.

2. Prepolymerization

As shown in FIG. 1, the monomer/oligomer mixture is pumped from the ester exchanger or direct esterification reactor to prepolymerizer 12 by means of a temperature-controlled feed line 16 equipped with pumps and, optionally, filters. In the feed lines, the monomer/oligomer mixture is maintained at a temperature of about 215° to 250° C.

Figure 2:
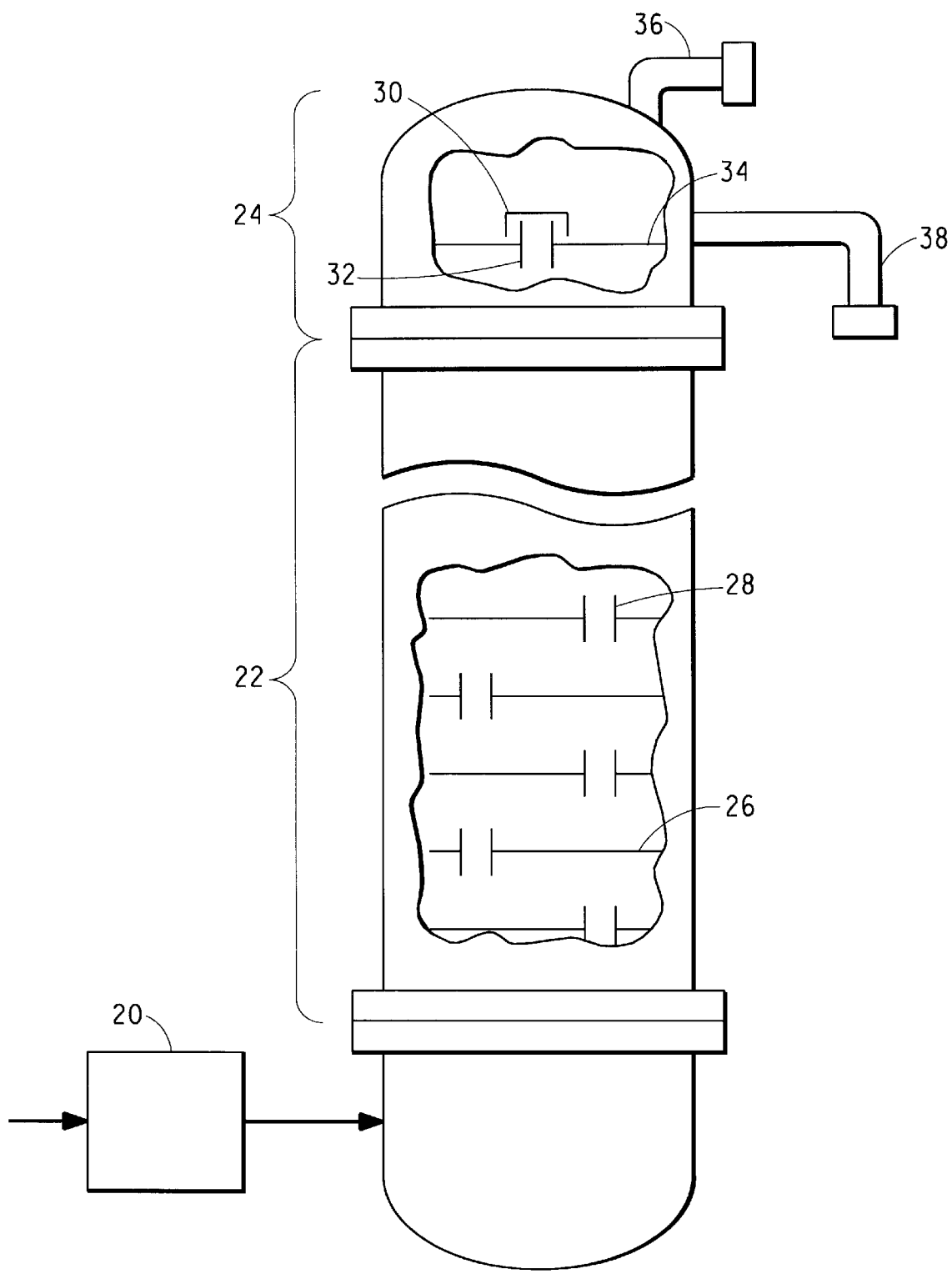
FIG. 2 is a schematic representation of a prepolymerizer useful in carrying out the prepolymerization step of the process of the invention.

Prepolymerizer 12 performs the initial polymerization step, which involves removing excess 1,3-propanediol and increasing the product viscosity by building longer chain molecules of polymer. As shown in FIG. 2, prepolymerizer 12 consists of three sections: preheater 20, tray section 22, and dome section 24.

The function of preheater 20 is to provide the heat necessary to carry out the prepolymerization reaction and to evaporate the excess 1,3-propanediol from the reaction mixture in the prepolymerizer. Preheater 20 is a heat exchanger having a plurality of tubes and a shell containing a heating medium, such as Dowtherm vapor. The monomer/oligomer mixture is heated as it passes through preheater 20 and it then enters the bottom of tray section 22.

Tray section 22 is surrounded by a jacket containing a heating medium such as Dowtherm vapor and contains a plurality of trays 26 dividing the column into a series of reaction zones, which are fluidly connected to one another by a plurality of risers 28. Gaps between the trays 26 and the risers 28 produce turbulence and generate thin films which allow the 1,3-propanediol to more readily diffuse from the prepolymer. The gaps and risers also provide inventory in the reactor (hold-up time) to drive the polymerization reaction to a higher molecular weight.

Dome section 24 includes bubble cap 30 with riser 32, uppermost tray 34, vapor outlet line 36, and polymer outlet line 38. The dome is surrounded by a jacket containing a heating medium, such as Dowtherm vapor. A vacuum is pulled on the top of the column through vapor outlet line 36, for example, by means of vacuum jets.

The liquid reaction mixture is heated to about 255° C. in preheater 20. The temperature of the liquid reaction mixture in tray section 22 is maintained at about 245° to 265° C., preferably about 250° to 260° C., and most preferably about 255° C. The structure of the tray section 22 results in a stepwise decrease in pressure from tray to tray from the bottom to the top of the prepolymerizer. The absolute pressure above the uppermost tray 34 in the prepolymerizer is maintained at about 4 to 18 mm Hg (553 to 2399 Pa), preferably about 6 to 12 mm Hg (800 to 1600 Pa), and most preferably about 6 mm Hg (800 Pa).

1,3-Propanediol vapor is a by-product of the polymerization reaction and is the driving force for operation of the prepolymerizer. The combination of heat at the bottom of the prepolymerizer and vacuum at the top vaporizes the 1,3-propanediol and pulls it up through tray section 22 causing a continuous regeneration of liquid-vapor interfaces. The 1,3-propanediol vapor entrains the liquid reaction mixture and carries it from the bottom to the top of tray section 22.

Entrainment of the liquid reaction mixture requires both adequate volume and velocity of the vapor, which are dependent upon the amount of the pressure drop from the bottom to the top of tray section 22, which is in turn dependent upon the mole ratio of propylene groups to terephthalate groups. For constant throughput and mole ratio, the pressure drop in the prepolymerizer is constant.

Dome section 24 separates the 1,3-propanediol vapor from the entrained prepolymer being carried up the column. The vapor and entrained prepolymer passing through uppermost tray 34 enter large bubble cap 30 through riser 32 in dome section 24. 1,3-Propanediol vapor enters the riser from the area below uppermost tray 34, exits the riser underneath bubble cap 30, and reverses its direction from up to down, allowing the entrained prepolymer liquid to strike the underneath portion of bubble cap 30, form droplets, and run down onto the uppermost tray 34. As the 1,3-propanediol vapor exits through notches in bubble cap 30, it reverses its direction again. Once the 1,3-propanediol vapor has entered dome section 24, the vapor velocity and entrainment capability is drastically reduced, which allows the liquid to drop out. The 1,3-propanediol vapors are removed from dome section 24 through vapor outlet line 36 which is connected to a vacuum system. The 1,3-propanediol vapors are then condensed and collected.

One method for condensing the 1,3-propanediol vapors from the prepolymerizer is by means of a spray condenser. Vapors from the vapor line pass into a vertical condenser, where they are sprayed with condensed 1,3-propanediol that has been cooled to a temperature of less than 60° C., preferably less than 50° C. The condensed 1,3-propanediol vapors from the prepolymerizer, together with the 1,3-propanediol spray, flow into a hotwell located beneath the condenser. A portion of the liquid mixture in the hotwell is pumped through a cooler to the top of the condenser for use as the condensing spray.

The 1,3-propanediol vapors exiting the prepolymerizer typically contain other reaction by-products such as acrolein and allyl alcohol. It is desirable that the production of by-products such as acrolein and allyl alcohol be minimized because both of these compounds are highly toxic and cause irritation to the eyes and mucous membranes. According to the process of the invention, the amount of acrolein contained in the condensed 1,3-propanediol stream exiting the prepolymerizer is no greater than 20 ppm by weight of condensate, preferably no greater than 10 ppm, and more preferably no greater than 0 ppm. The amount of allyl alcohol contained in the condensed 1,3-propanediol stream exiting the prepolymerizer is no greater than 170 ppm by weight of condensate, preferably no greater than 130 ppm, and more preferably no greater than 40 ppm.

The liquid poly(trimethylene terephthalate) reaction product exits the prepolymerizer by means of gravity or a pump through polymer outlet line 38 connected to uppermost tray 34.

Relative viscosity is an indicator of molecular weight. Relative viscosity, often referred to as "LRV," is the ratio of the viscosity of a solution of 4.75 grams of poly (trimethylene terephthalate) in 100 grams of solution to the viscosity of the solvent itself. The solvent used herein for measuring relative viscosity is hexafluoroisopropanol containing 100 ppm sulfuric acid, and the measurements are made at 25° C. The relative viscosity of the poly (trimethylene terephthalate) exiting the prepolymerizer is at least about 5, preferably about 9 to 10.

The residence or hold-up time in the prepolymerizer typically ranges from about 20 to 45 minutes.

3. Final Polymerization

As shown in FIG. 1, the liquid reaction product from prepolymerizer 12 is fed to final polymerizer or finisher 14 by means of a temperature-controlled feed line 18. The major purpose of finisher 14 is to increase the molecular chain length or viscosity of the polymer. This is accomplished by using heat, agitation, vacuum and catalyst. It is desirable that the molecular weight of the finished polymer be maximized, so that further processing, for example, solid state polymerization, can be avoided prior to fiber spinning or other forming operation.

The finisher is normally a horizontal cylindrical vessel surrounded by a jacket containing a heating medium, such as Dowtherm vapor. Prepolymer from prepolymerizer 12 flows through an inlet into the finisher. An agitator generates large surface areas of thin films of polymer to enhance the mass transfer of 1,3-propanediol from the polymer.

The temperature of the liquid reactants in the finisher is maintained at about 245° to 265° C., preferably about 250° to 260° C., and more preferably about 255° C. The pressure in the finisher is maintained at about 0.5 to 3.0 mm Hg (66 to 400 Pa).

Finished polymer is removed from the finisher through an outlet by means of a pump. The relative viscosity of the poly(trimethylene terephthalate) exiting the finisher is at least about 17, preferably about 35 or greater, more preferably about 40 or greater, more preferably about 45 or greater, and most preferably about 50 or greater. When correlated to intrinsic viscosity measurements in 60/40 weight percent phenol/1,1,2,2-tetrachloroethane following ASTM D 4603-96, these relative viscosities correspond to intrinsic viscosities of about 0.55 dl/g, 0.85 dl/g, 0.91 dl/g, 0.96 dl/g and 1.0 dl/g, respectively. The viscosity of the finished polymer may be controlled by adjusting finisher pressure or other variables. The residence or hold-up time in the finisher is typically about 1 to 2 hours.

1,3-Propanediol and other gaseous by-products are removed from the finisher by vacuum followed by condensation. One method for condensing the 1,3-propanediol vapors from the finisher is by means of a spray condenser similar to that described above for condensing 1,3-propanediol vapors from the prepolymerizer.

According to the present invention, the amount of acrolein contained in the condensed 1,3-propanediol stream exiting the finisher is no greater than 80 ppm by weight of condensate, preferably no greater than 45 ppm, and more preferably no greater than 25 ppm. The amount of allyl alcohol contained in the condensed 1,3-propanediol stream exiting the finisher is no greater than 1000 ppm, preferably no greater than 650 ppm, and more preferably no greater than 500 ppm.

The finished polymer may be pelletized or fed directly to a forming operation, such as fiber spinning, film formation or molding operation. Fibers made from the poly (trimethylene terephthalate) produced by the process of the invention have properties which make them useful in various textile applications, including the manufacture of carpet or apparel.

4. Additives

Various additives may be used in the process of the invention. These include color inhibitors, such as phosphoric acid, delusterants, such as titanium dioxide, dyeability modifiers, pigments and whiteners. If separate ester exchange and polymerization catalysts are used, phosphoric acid ($H_3PO_4$) or other color inhibitors may be added to minimize or prevent the color forming property of the ester exchange catalyst.

EXAMPLES 1–27

Using an apparatus of the type indicated in the drawings, together with an ester exchanger, a 76.4 lb./hr (34.7 kg/hr) stream of dimethylterephthalate was preheated to a temperature of 185° C. and continuously mixed with a 44.9 lb./hr (20.4 kg/hr) stream of catalyzed 1,3-propanediol which was also preheated to a temperature of 185° C., to form a mixture having a mole ratio of 1.5 moles of 1,3-propanediol per mole of dimethylterephthalate. The catalyst was tetraisopropyl titanate (Tyzor® TPT, available from E. I. du Pont de Nemours and Company, Wilmington, Del.), DuPont Performance Chemicals), which was added to the 1,3-propanediol in an amount sufficient to yield 50 ppm by weight of titanium based on the total weight of poly(trimethylene terephthalate) formed in the process. The dimethylterephthalate/catalyzed 1,3-propanediol mixture was fed into the base of an ester exchanger, where the temperature of the liquid reactants was maintained at 237° C., and the pressure at the base of the ester exchanger was maintained at 900 to 950 mm Hg (119,970 to 126,635 Pa). The pressure at the top of the ester exchange column was atmospheric. In the ester exchanger, the 1,3-propanediol reacted with the dimethylterephthalate to form bis-3-hydroxypropyl terephthalate monomer and low molecular weight oligomers of 1,3-propanediol and terephthalic acid, liberating methanol vapor, which was continuously removed from the top of the ester exchanger. The monomer/oligomer mixture was continuously removed from the base of the ester exchanger and fed to the base of a prepolymerizer. In the prepolymerizer, the monomers and oligomers reacted to form a poly(trimethylene terephthalate) prepolymer, liberating 1,3-propanediol vapor. The 1,3-propanediol vapor and other gaseous by-products were removed from the top of the prepolymerizer and condensed. The poly(trimethylene terephthalate) prepolymer was continuously withdrawn from the uppermost plate of the prepolymerizer and fed to the inlet end of a finisher vessel. The temperature of the liquid reactants in the finisher was maintained at 255° C. In the finisher, the poly(trimethylene terephthalate) prepolymer reacted to form a higher molecular weight polymer, liberating additional 1,3-propanediol vapor. The 1,3-propanediol vapor and other gaseous by-products were continuously removed from the finisher. The poly(trimethylene terephthalate) was continuously removed from the finisher and pelletized. The conditions and results for the continuous polymerization are set forth in Table I for the prepolymerizer and Table II for the finisher.

In Tables I and II, the temperature in the prepolymerizer is given as the temperature of the lowermost plate. The acrolein and allyl alcohol levels are given in parts per million (ppm) by weight based on the total condensate that is removed from the prepolymerizer and finisher, respectively. The dipropylene glycol (DPG) levels are given as a weight percent based on the total prepolymer or finished polymer that is removed from the prepolymerizer and finisher, respectively. The speed of the agitator in the finisher is given in revolutions per minute (RPM). The amount of carboxyl end groups (COOH) in the finished polymer is given in microequivalents per gram based on the total weight of the finished polymer. The level of catalyst is given as parts per million (ppm) by weight of titanium in the finished polymer.

TABLE I

| | Prepolymerizer | | | | | |
|---|---|---|---|---|---|---|
| Example | Temp. (#1 plate) (°C.) | Pressure mm Hg (Pa) | LRV | Acrolein (ppm) | Allyl Alcohol (ppm) | DPG (wt. %) |
| 1 | 246 | 6.5 (866) | 8.3 | 0 | 31 | 0.13 |
| 2 | 246 | 9.6 (1280) | 7.7 | 0 | 40 | 0.12 |
| 3 | 246 | 11.9 (1586) | | 0 | 40 | 0.13 |
| 4 | 256 | 12.9 (1720) | 6.9 | 0 | 40 | 0.13 |
| 5 | 256 | 8.7 (1160) | 8.4 | 0 | 51 | 0.14 |
| 6 | 256 | 9.0 (1200) | 8.8 | 8 | 36 | 0.15 |
| 7 | 266 | 6.9 (920) | 9.6 | 0 | 36 | 0.14 |
| 8 | 266 | 11.1 (1480) | 8.9 | 0 | 53 | 0.15 |
| 9 | 266 | 11.4 (1520) | 8.8 | 0 | 84 | 0.18 |
| 10 | 266 | 19.2 (2559) | 7.2 | 8 | 171 | 0.22 |
| 11 | 266 | 18.2 (2426) | 7.1 | 8 | 132 | 0.23 |
| 12 | 266 | 11.8 (1573) | 7.6 | 8 | 125 | 0.15 |
| 13 | 256 | 30 (3999) | 6.8 | 0 | 93 | 0.17 |
| 14 | 256 | 12.2 (1626) | 7.5 | 0 | 58 | 0.15 |
| 15 | 256 | 6.1 (813) | 9.0 | 0 | 27 | 0.14 |
| 16 | 256 | 6.9 (920) | 9.0 | 8 | 28 | 0.14 |
| 17 | 256 | 6.9 (920) | 8.6 | 5 | 45 | 0.11 |
| 18 | 256 | 12.1 (1613) | 8.7 | 6 | 43 | 0.10 |
| 19 | 256 | 11.4 (1520) | 7.3 | 5 | 63 | 0.15 |
| 20 | 256 | 11.7 (1560) | 7.7 | 0 | 39 | 0.16 |
| 21 | 256 | 17.3 (2306) | 7.0 | 6 | 46 | — |
| 22 | 256 | 6.1 (813) | 9.0 | 21 | 30 | 0.13 |
| 23 | 256 | 6.3 (840) | 8.9 | 0 | 22 | 0.12 |
| 24 | 256 | 6.6 (880) | 8.7 | 16 | 23 | 0.12 |
| 25 | 256 | 6.1 (813) | 8.8 | 0 | 36 | 0.12 |
| 26 | 256 | 5.5 (733) | 8.9 | 0 | 23 | 0.13 |
| 27 | 256 | 7.7 (1026) | 8.9 | 0 | 32 | 0.12 |

TABLE II

| | Finisher | | | | | | |
|---|---|---|---|---|---|---|---|
| Example | Pressure mm Hg (Pa) | Agitator (RPM) | LRV | Acrolein (ppm) | Allyl Alcohol (ppm) | DPG (wt. %) | COOH (microeq. per g) |
| 1 | <1.5 (<200) | 3 | 32 | 26 | 486 | 0.17 | 27 |
| 2 | <1.5 (<200) | 3 | 32 | 26 | 537 | 0.21 | 23 |
| 3 | <1.5 (<200) | 3 | 32 | 26 | 555 | 0.16 | 24 |
| 4 | <1.5 (<200) | 3 | 31 | 0 | 578 | 0.17 | 24 |
| 5 | <1.5 (<200) | 3 | 32 | 30 | 639 | 0.17 | 31 |
| 6 | <1.5 (<200) | 3 | 33 | 35 | 777 | 0.17 | 23 |
| 7 | <1.5 (<200) | 3 | 33 | 31 | 700 | 0.16 | 23 |
| 8 | <1.5 (<200) | 3 | 32 | 15 | 678 | 0.16 | 18 |
| 9 | <1.5 (<200) | 3 | 31 | 31 | 670 | 0.16 | 28 |
| 10 | <1.5 (<200) | 3 | 33 | 33 | 760 | 0.19 | 14 |
| 11 | <1.5 (<200) | 3 | 36 | 42 | 873 | 0.18 | 12 |
| 12 | <1.5 (<200) | 3 | 38 | 41 | 911 | 0.18 | 13 |
| 13 | <1.5 (<200) | 3 | 37 | 46 | 996 | 0.18 | 16 |
| 14 | <1.5 (<200) | 3 | 40 | 36 | 1015 | 0.18 | 13 |
| 15 | <1.5 (<200) | 3 | 41 | 44 | 1013 | 0.17 | 28 |
| 16 | 1.7–1.9 (227–253) | 3 | 39 | 35 | 982 | 0.19 | 19 |
| 17 | 1.7–1.9 (227–253) | 3 | 37 | 38 | 836 | 0.18 | 14 |
| 18 | 1.7–1.9 (227–253) | 3 | 38 | 25 | 524 | 0.18 | 15 |
| 19 | 1.7–1.9 (227–253) | 3 | 36 | 23 | 521 | 0.16 | 14 |
| 20 | 1.7–1.9 (227–253) | 3 | 41 | 20 | 441 | 0.20 | 27 |
| 21 | 1.7–1.9 (227–253) | 3 | 40 | 22 | 472 | 0.19 | 16 |
| 22 | 1.7–1.9 (227–253) | 3 | 37 | 11 | 453 | 0.17 | 18 |
| 23 | 1.7–1.9 (227–253) | 5 | 40 | 19 | 412 | 0.16 | 17 |
| 24 | 1.7 (227) | 2 | 33 | 22 | 431 | 0.15 | 20 |
| 25 | 1.5 (200) | 2 | 37 | 22 | 551 | 0.14 | 14 |
| 26 | 1.3–1.4 (173–187) | 2 | 42 | 21 | 608 | 0.14 | 12 |
| 27 | <1.5 (<200) | 1.75 | 52 | 21 | 464 | 0.15 | 13 |

What is claimed is:
1. A continuous process for the production of poly(trimethylene terephthalate) comprising the steps of:
   (a) continuously feeding a liquid feed mixture to a prepolymerizer, the liquid feed mixture comprising a catalyst, at least one of bis-3-hydroxypropyl terephthalate and low molecular weight polyesters containing propylene groups and terephthalate groups, the liquid feed mixture having a mole ratio of propylene groups to terephthalate groups of 1.1 to 2.2;
   (b) continuously polymerizing in the prepolymerizer the at least one of bis-3-hydroxypropyl terephthalate and low molecular weight polyesters to form a poly(trimethylene terephthalate) prepolymer and a first stream of gaseous by-products, wherein the pressure in a top portion of the prepolymerizer is maintained at about 4 to about 18 mm of Hg;
   (c) continuously withdrawing the poly(trimethylene terephthalate) prepolymer from the prepolymerizer, the prepolymer having a relative viscosity of at least about 5;
   (d) continuously feeding the poly(trimethylene terephthalate) prepolymer to a final polymerizer and continuously polymerizing in the final polymerizer the poly(trimethylene terephthalate) prepolymer to form a higher molecular weight poly(trimethylene terephthalate) and a second stream of gaseous by-products, wherein the pressure in the final polymerizer is maintained at about 0.5 to about 3.0 mm of Hg; and

(e) continuously withdrawing the higher molecular weight poly(trimethylene terephthalate) from the final polymerizer, the higher molecular weight poly (trimethylene terephthalate) having a relative viscosity of at least about 17.

2. The process according to claim 1, wherein the temperature of liquid liquid reactants comprising the at least one of bis-3-hydroxypropyl terephthalate and low molecular weight polyesters reactants in the prepolymerizer is maintained at about 245° to about 265° C.

3. The process according to claim 1, wherein the temperature of liquid reactants comprising the at least one of bis-3-hydroxypropyl terephthalate and low molecular weight polyesters in the prepolymerizer is maintained at about 250° to about 260° C.

4. The process according to claim 1, wherein the pressure in a top portion of the prepolymerizer is maintained at about 6 to about 12 mm of Hg.

5. The process according to claim 1, wherein the temperature of liquid reactants comprising the poly (trimethylene terephthalate) prepolymer in the final polymerizer is maintained at about 245° to about 265° C.

6. The process according to claim 1, wherein the temperature of liquid reactants comprising the poly (trimethylene terephthalate) prepolymer in the final polymerizer is maintained at about 250° to about 260° C.

7. The process according to claim 1, wherein the poly (trimethylene terephthalate) that is withdrawn from the final polymerizer has a relative viscosity of at least about 35.

8. The process according to claim 1, wherein the poly (trimethylene terephthalate) that is withdrawn from the final polymerizer has a relative viscosity of at least about 40.

9. The process according to claim 1, wherein the poly (trimethylene terephthalate) that is withdrawn from the final polymerizer has a relative viscosity of at least about 45.

10. The process according to claim 1, wherein the poly (trimethylene terephthalate) that is withdrawn from the final polymerizer has a relative viscosity of at least about 50.

11. The process according to claim 1, wherein the first stream of gaseous by-products is continuously removed from the prepolymerizer and condensed, and the first stream of condensed by-products contains not more than 20 ppm by weight of acrolein and not more than 170 ppm of allyl alcohol.

12. The process according to claim 10, wherein the first stream of condensed by-products contains not more than 10 ppm by weight of acrolein and not more than 130 ppm of allyl alcohol.

13. The process according to claim 1, wherein the second stream of gaseous by-products is continuously removed from the final polymerizer and condensed, and the second stream of condensed by-products contains not more than 80 ppm of acrolein and not more than 1000 ppm of allyl alcohol.

14. The process according to claim 11, wherein the second stream of condensed by-products contains not more than 45 ppm of acrolein and not more than 650 ppm of allyl alcohol.

15. The process according to claim 1, wherein the liquid feed mixture is fed to a bottom portion of the prepolymerizer, and the poly(trimethylene terephthalate) is withdrawn from a top portion of the prepolymerizer, and wherein the prepolymerizer comprises a series of vertically superposed reaction zones, and heat is applied to a bottom portion of the prepolymerizer and a vacuum is applied to a top portion of the prepolymerizer, resulting in a stepwise decrease in pressure from each reaction zone to the following reaction zone and a continuous decrease in pressure from the bottom portion of the prepolymerizer to the top portion of the prepolymerizer.

16. The process according to claim 15, wherein 1,3-propanediol vapor is evolved from the liquid reactants in the prepolymerizer, and the 1,3-propanediol vapor entrains the liquid reactants and conveys them from the bottom portion of the prepolymerizer through each reaction zone to the top portion of the prepolymerizer, and wherein the evolution of 1,3-propanediol from the liquid reactants causes agitation of the liquid reactants in each reaction zone and a continuous regeneration of liquid-gas interfaces.

17. The process according to claim 1, wherein the temperature of liquid reactants comprising the at least one bis-3-hydroxpropyl terephthalate and low molecular weight polyesters in the prepolymerizer is maintained at about 245° to about 265° C.; and the temperature of liquid reactants comprising the poly(trimethylene terephthalate) prepolymer in the final polymerizer is maintained at about 245° to about 265° C.

18. A continuous process for the production of poly (trimethylene terephthalate) comprising the steps of:

(a) continuously feeding a liquid feed mixture to a prepolymerizer, the liquid feed mixture comprising a catalyst, at least one of bis-3-hydroxypropyl terephthalate and low molecular weight polyesters containing propylene groups and terephthalate groups having an average degree of polymerization of not greater than 15, and the liquid feed mixture having a mole ratio of propylene groups to terephthalate groups of 1.1 to 2.2;

(b) continuously polymerizing in the prepolymerizer the at least one of bis-3-hydroxypropyl terephthalate and low molecular weight polyesters to form a poly (trimethylene terephthalate) prepolymer and a first stream of gaseous by-products, wherein the temperature of liquid reactants comprising the at least one of bis-3-hydroxypropyl terephthalate and low molecular weight polyesters in the prepolymerizer is maintained at about 245° to about 265° C., and the pressure in a top portion of the prepolymerizer is maintained at about 4 to about 18 mm of Hg;

(c) continuously withdrawing the poly(trimethylene terephthalate) prepolymer from the prepolymerizer, the prepolymer having a relative viscosity of at least about 5;

(d) continuously removing and condensing the first stream of gaseous by-products from the prepolymerizer, wherein the resulting condensate contains not more than 20 ppm by weight of acrolein and not more than 170 ppm of allyl alcohol;

(e) continuously feeding the poly(trimethylene terephthalate) prepolymer to a final polymerizer, and continuously polymerizing in the final polymerizer the poly(trimethylene terephthalate) prepolymer to form a higher molecular weight poly(trimethylene terephthalate) and a second stream of gaseous by-products, wherein the temperature of liquid reactants comprising the poly(trimethylene terephthalate) prepolymer in the final polymerizer is maintained at about 245° to about 265° C., and the pressure in the final polymerizer is maintained at about 0.5 to about 3.0 mm Hg; and (f) continuously withdrawing the higher molecular weight poly(trimethylene terephthalate) from the final polymerizer, the higher molecular weight poly (trimethylene terephthalate) having a relative viscosity of at least about 35;

(g) continuously removing and condensing the second stream of gaseous by-products from the final polymerizer, wherein the resulting condensate contains not more than 80 ppm by weight of acrolein and not more than 1000 ppm of allyl alcohol.

19. A continuous process for the production of poly (trimethylene terephtalate) comprising the steps of:
   (a) continuously feeding a liquid feed mixture to prepolymerizer, the liquid feed mixture comprising a catalyst and at least one of bis-3-hydroxpropyl tereph-talate and low molecular weight polysters containing propylene groups and terephtalate groups, the liquid feed mixture having a mole ratio of propylene groups to terephtalate groups of 1.1 to 2.2;
   (b) continuously polymerizing in the prepolymerizer, with application of a vacuum, the at least one of bis-3-hydroxypropyl terephthalate and low molecular weight polysters to form a poly(trimethylene terephthalate) prepolymer and a first stream gaseous by-products;
   (c) continuously withdrawing the poly(trimethylene terephtalate) prepolymer from the prepolymerizer, the prepolymer having a relative viscosity of at least about 5;
   (d) continuously feeding the poly(trimethylene terephthalate) prepolymer to a final polymerizer and continuously polymerizing in the final polymerizer under vacuum the poly(trimethylene terephthalate) prepolymer to form a higher molecular weight poly (trimethylene terephthalate) and a second stream of gaseous by-products; and
   (e) continuously withdrawing the higher molecular weight poly(trimethylene terephthalate) from the final polymerizer, the higher molecular weight poly (trimethylene terephthalate) having a relative viscosity of at least about 17.

20. The process according to claim 19, the pressure in a top portion of the polymerizer is maintained at about 4 to about 18 mm of Hg.

21. The process according to claim 19, wherein the pressure in the final polymerizer is maintained at about 0.5 to 3.0 mm of Hg.

22. The process according to claim 1, further comprising preparing the liquid feed mixture by ester exchange of dimethylterephthalate and, 1,3-propanediol.

23. The process according to claim 1, further comprising preparing the liquid feed mixture by direct esterification from terephthalic acid and, 1,3-propanediol.

24. The process according to claim 19:
   (a) wherein the prepolymerizer comprises a column comprising a series of vertically superposed reaction zones, which are fluidly connected to one another by a plurality of risers, and the liquid feed mixture is fed to a bottom portion of the prepolymerizer, and the poly (trimethylene terephthalate) is withdrawn from a top portion of the prepolymerizer, and wherein the reaction zones contain liquid reactants comprising the liquid feed mixture and longer chain molecules of the polyester formed from the liquid feed mixture, and heat is applied to a bottom portion of the prepolymerizer such that the liquid reactants in the prepolymerizer are maintained at about 245° to about 265°; and a vacuum is applied to a top portion of the prepolymerizer so that the pressure in a top portion of the prepolymerizer is maintained at about 4 to about 18 mm of Hg, and so that there is a stepwise decrease in pressure from each reaction zone to the following reaction zone and continuous decrease in pressure from the bottom portion of the prepolymerizer to the top portion of the prepolymerizer;
   (b) wherein 1,3-propanediol vapor is evolved from the liquid reactants in the prepolymerizer, and the 1,3-propanediol vapor entrains the liquid reactants and conveys them from the bottom portion of the prepolymerizer through each reaction zone to the top portion of the prepolymerizer, and wherein the evolution of 1,3-propanediol from the liquid reactants causes agitation of the liquid reactants in each reaction zone and a continuous regeneration of liquid-gas interfaces;
   (c) wherein the final polymerizer contains the poly (trimethylene terephthalate) prepolymer as a liquid maintained at about 245° to about 265° C.; and the pressure in the final polymerizer is maintained at about 0.5 to about 3.0 mm Hg; and
   (d) wherein the process further comprises preparing the liquid feed mixture using a catalyst by ester exchange of dimethylterephthalate and 1,3- propanediol or by direct esterification from terephthalic acid and 1,3-propanediol.

25. The process according to claim 24 wherein the preparing the liquid feed mixture is by the ester exchange of dimethylterephthalate and 1,3-propanediol and the catalyst for the ester exchange is a titanium catalyst.

26. The process according to claim 25 wherein the titanium catalyst is tetraisopropyl titanate and is added to the 1,3-propanediol in an amount sufficient to yield 20 to 90 ppm of titanium by weight based on the higher molecular weight poly(trimethylene terephthalate) from the final polymerizer.

27. The process according to claim 24, wherein the preparing the liquid feed mixture is by the direct esterification from terephthalic acid and 1,3-propanediol and the catalyst is selected from the group consisting of organo-titanium and organo-tin compounds, which are added to the 1,3-propanediol in an amount sufficient to yield at least 20 ppm of titanium, or at least 50 ppm of tin, respectively, by weight based on the weight of the higher molecular weight poly(trimethylene terephthalate) from the final polymerizer.

28. The process according to claim 24, wherein the first stream of gaseous by-products is continuously removed from the prepolymerizer and condensed, and the first stream of condensed by-products contains not more than 10 ppm by weight of acrolein and not more the 40 ppm of allyl alcohol and the second stream of condensed by-products contains not more than 25 ppm of acrolein and not more than 500 ppm of allyl alcohol.

29. The process of any of the foregoing claims further comprising the (a) optionally pelletizing the higher molecular weight poly(trimethylene terephthalate) and (b) forming the higher molecular weight poly(trimethylene terephthalate) into fibers, film or molded product, wherein solid state polymerization is not carried out prior to forming.

* * * * *